(12) United States Patent
Klein

(10) Patent No.: US 7,790,087 B2
(45) Date of Patent: Sep. 7, 2010

(54) APPARATUS FOR THE FABRICATION OF A LIPSTICK LEAD WITH TWO COMPONENTS

(75) Inventor: Helmut Klein, Peissenberg (DE)

(73) Assignee: Weckerle GmbH, Weilhem (DE)

( * ) Notice: Subject to any disclaimer, the term of this patent is extended or adjusted under 35 U.S.C. 154(b) by 0 days.

(21) Appl. No.: 12/142,958

(22) Filed: Jun. 20, 2008

(65) Prior Publication Data

US 2009/0020912 A1   Jan. 22, 2009

(30) Foreign Application Priority Data

Jun. 21, 2007   (EP) .................................. 07012147

(51) Int. Cl.
- *B29C 33/48* (2006.01)
- *B29C 39/14* (2006.01)
- *B29C 39/34* (2006.01)

(52) U.S. Cl. .................... 264/318; 264/255; 264/328.8; 425/438; 425/577; 425/DIG. 32; 425/DIG. 58

(58) Field of Classification Search ................ 425/577, 425/DIG. 32; 264/318, 328.8, 255
See application file for complete search history.

(56) References Cited

U.S. PATENT DOCUMENTS

| 3,752,436 | A  | * | 8/1973  | Deutsch ...................... 249/145 |
| 4,986,942 | A  | * | 1/1991  | Irgens et al. .................. 264/51 |
| 2002/0085983 | A1 | * | 7/2002  | Fleissman et al. ............. 424/64 |
| 2003/0189274 | A1 | * | 10/2003 | Graham et al. .............. 264/318 |
| 2005/0169858 | A1 | * | 8/2005  | Look et al. .................... 424/59 |

FOREIGN PATENT DOCUMENTS

EP   0581749   * 2/1994

* cited by examiner

*Primary Examiner*—Joseph S. Del Sole
*Assistant Examiner*—Robert Dye
(74) *Attorney, Agent, or Firm*—Howard & Howard Attorneys PLLC

(57) ABSTRACT

Molding apparatus (1) for molding of materials consisting of at least two components, in particular for molding lipstick leads with at least one mold (2) in which the material to be molded may be poured and with a core (3) which may be inserted into and extracted out of the at least one mold (2), wherein the at least one core (3) has a modifiable outer surface, as well as a corresponding method.

11 Claims, 3 Drawing Sheets

APPARATUS FOR THE FABRICATION OF A LIPSTICK LEAD WITH TWO COMPONENTS

RELATED APPLICATION

This application claims priority to European Patent Application Serial No. EP 07 012 147.0 filed Jun. 21, 2007.

BACKGROUND OF THE INVENTION

The present invention relates to a mold for the fabrication of a molded material from materials with at least two components and in particular a method for the fabrication of lipstick leads from at least two components.

In a mold apparatus for molding materials, for example for the fabrication of lipstick leads, the one material to be molded is filled into several molds in the hot and liquid state by means of a filling station. The filled in material is then cooled down in the molds by means of a cooling station and extracted out of the molds after the cooling process by means of a demolding station.

In U.S. Pat. No. 4,743,443 and DE 946257 A, apparatuses and methods are described for the fabrication of lipstick leads from a material consisting of two or more different components. To this end, extractable inserts are used. These avoid in a first step that, when filling in the first component, the first component reaches an area in which the second component is to be filled in a second step.

With such methods, however, only lipstick leads with very simple designs for the first and the second component may be molded. Basically, there is a need for apparatuses and methods for the fabrication of lipstick leads with the at least two components forming complicated designs and structures, respectively. The object of the present invention, therefore, consists of providing a corresponding method and a corresponding apparatus.

SUMMARY OF THE INVENTION

According to the invention, this object is solved by a molding apparatus for the molding of materials consisting of at least two components according to claim 1 and a corresponding method according to claim 6.

The molding apparatus for the molding of materials consisting of at least two components, in particular for the molding of lipstick leads, to this end has at least one mold in which the material to be molded is poured in. Furthermore, the molding apparatus has at least one core, which may be inserted into and extracted out of the at least one mold. According to the invention, the at least one core has a modifiable outer surface.

By means of the molding apparatus according to the invention, it is possible for the first time, to form molded materials from two or more components, with the molded material form the at least one of the two components having a complicated design or structure. With the cores used in the art, the design formed by the first component has to be such simple that the core used for this purpose may be extracted out of the mold without impairment. Such designs of molded components or materials respectively are called simple. With complicated designs, the simple extraction of the core is not possible. If, for example, a complicated mesh structure from a first component is to be arranged at the outer surface of the lipstick lead, which is enclosed by the second component, this mesh structure may not be formed by the apparatuses and methods known in the art. This meshed design is thus an example of a complicated design.

By the apparatus according to the invention, however, such a complicated design may be formed. To this end, a core is used for example, whose outer surface forms the complement of the design to be formed by the first component. By the modifiable outer surface of the core according to the invention, the core may be extracted from the mold without impairment of the design formed out of the first component. To this end, the outer surface of the core is modified prior to extraction out of the mold such that the design formed by the first component is not damaged.

In a preferred embodiment, the at least two components have different colors.

In a further preferred embodiment, the apparatus has a second modifiable core, wherein the dimensions of the second core are at least partially smaller than the dimensions of the first core. By means of such a second core, a molded material from three components for example may be fabricated.

Preferably, the modifiable outer surface of the core is implemented by a contracting core. The contracting core may be fabricated for example from a flexible material. During the molding of the design of the first components, the flexible core is maintained in its shape by means of a appropriate means. To this end for example, the flexible core may be filled with a gas or a liquid. For extracting the core out of the mold and the design formed by the first component, the means makes sure that the core does not maintain its shape any more but virtually collapses back upon itself or is contracted upon itself. To this end, for example, the liquid or gas may be removed from the flexible core.

According to the invention, the core has movable elements, with which the outer surface may be modified. These movable elements may for example be moved by means of pressure or magnetism. During the filling in of the first component, the movable elements may be moved out. According to the invention, the movable elements touch the inner wall of the mold in the moved out state. Thus, these areas are kept free from the first component.

For extracting the core, the movable elements are preferably moved into the core to allow for extracting the core out of the design formed by the first component.

To allow for a demolding as simple as possible, the core according to the invention is coated by an anti-adhesive material. Furthermore, the core has preferably channels, through which selectively a heating or cooling medium may flow. By using channels for a heating or cooling medium at the outer surface of the form and in the core, the curing process may be accelerated compared to using just a single component.

Thereupon, the outer surface of the core is modified and the core is extracted out of the mold. Then the second component of the material to be molded is filled into the mold.

Further advantages and features of the invention may be inferred from the following detailed description in which the invention is described in more detail and with reference to the embodiments illustrated in the attached drawings.

DETAILED DESCRIPTION OF THE PREFERRED EMBODIMENTS

Figure 1:
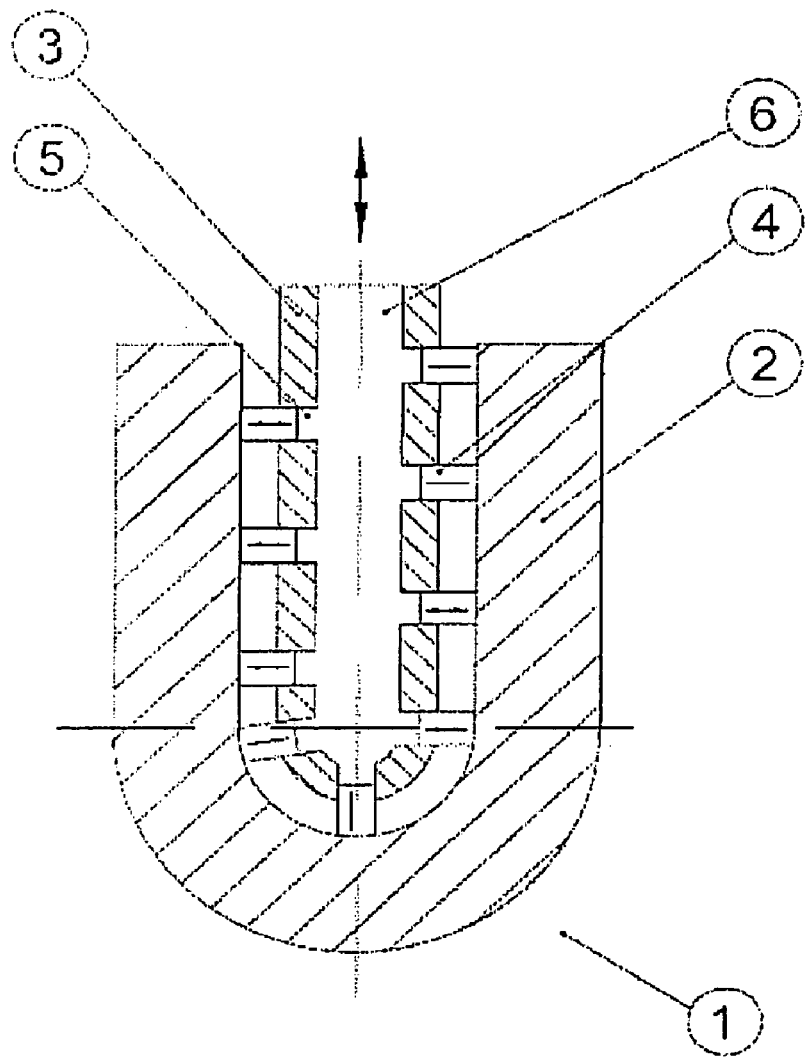
FIG. 1 shows a cross section of the molding apparatus with a mold and a core with moved out movable elements, how it may be used in the context of the present invention.

FIG. 1 shows a cross section through a molding apparatus 1 with a mold 2 and a core 3, how it may be used within the present invention. In FIG. 1 the core 3 is located in the mold 2. The core 3 has movable elements in this embodiment, with which the outer surface of the core 3 may be modified.

In FIG. 1 the movable elements 4 are in a so called moved out state. The movable elements 4 are moved out of the core 3 such that they make contact between the core 3 and inner surface of the mold 2. In the present embodiment, the movable elements 4 touch the inner surface of the mold 2 such that a first component filled into the space between mold 2 and core 3 can not touch the inner surface of the mold 2 at these areas.

Thus, a cavity is formed by the core 3, the movable elements 4 and the mold 2, in which the first component may be filled. Thereby, the cavity defines the portion of the lipstick lead in which the first component is to be arranged later.

Figure 2:
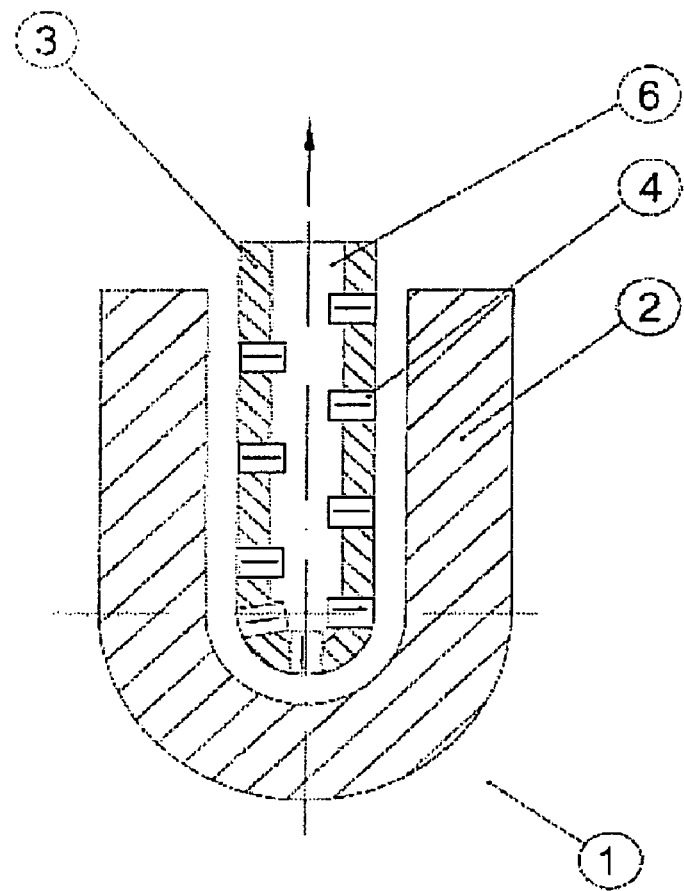
FIG. 2 shows a cross section through the molding apparatus shown in FIG. 1 with moved in movable elements in the core.

The core 3 furthermore has recesses 5. In these recesses 5, the movable elements 4 may be moved in. FIG. 2 exemplarily illustrates how the core 3 with the moved in movable elements 4 may look like.

The moving out and moving in of the movable elements 4 may be facilitated by different means. In the FIGS. 1 and 2 the core 3 has a channel 6 in its interior. By means of this channel 6 the movable elements 4 may be moved, thus moved out and moved in, by means of pressure. Alternatively, the movable elements 4 may be moved by means of magnetism or mechanical means for example.

By means of the apparatus 1 according to the invention, a lipstick lead may be fabricated simply. In a first step the core 3 for example is inserted into the mold 2. While doing so, the movable elements 4 used in this embodiment may already be moved out of the core 3 or may be moved out not until the core 3 is arranged in the mold 2. The core 3 forms a cavity together with the movable elements 4 and the inner surface of the mold 3, which may then be filled with the first component. After the filling in, the first component cures, preferably supported by cooling means, which may be arranged in the mold 2 and/or the core 3.

After the at least partial curing of the first component, the core 3 is extracted out of the mold 2. To this end, the modifiable outer surface of the core 3 is modified first. In the embodiment shown in FIGS. 1 and 2, this modifying of the outer surface happens by moving in the movable elements 4. Thereby the outer surface of the core 3 is modified such that the core 3 may be extracted out of the mold 2 without damaging the at least partially cured first component.

Figure 3:
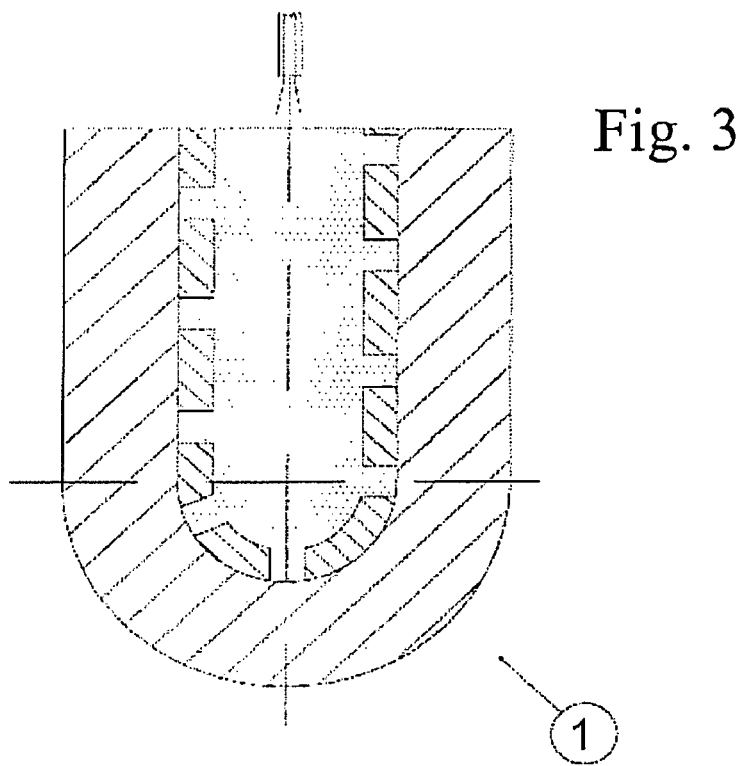
FIG. 3 shows a cross section through the molding apparatus shown in FIG. 1 during the filling in of the second component.
Figure 4:
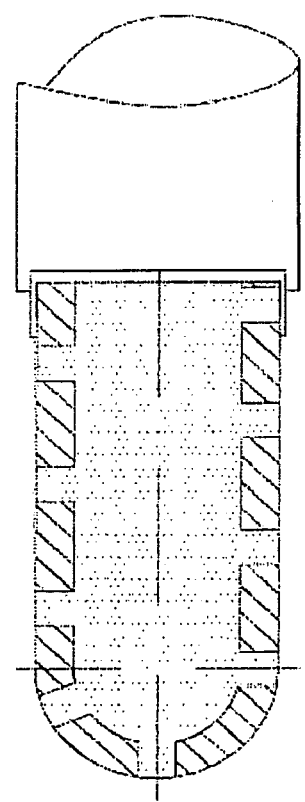
FIG. 4 shows the lipstick lead formed by the molding apparatus and the method according to the invention.

After extracting the core 3, the second component is filled into the cavity formed by the inner surface of the mold 2 and the at least partially cured first component (cf. FIG. 3). Subsequently, the lipstick lead formed by at least two components may be extracted out of the mold 2 by known demolding stations (cf. FIG. 4).

According to the invention, the object is also solved by a method for molding of materials consisting of at least two components. To this end, at least one core is inserted into a mold and then the first component of the material to be molded is filled into the mold.

The invention claimed is:

1. Method for molding of materials consisting of at least two components, in particular for molding lipstick leads, wherein the method includes the following steps:
    inserting at least one core (3) in at least one mold (2),
    filling in of a first component of said at least two components of said material to be molded in said mold (2),
    modifying the outer surfaces of said core (3),
    extracting said core (3) with the modified outer surfaces out of said mold (2) and
    filling in of a second component of said at least two components of said material to be molded into said mold (2)
    characterized in that
    the outer surface of the core (3) is modified by means of movable elements (4), wherein the movable elements (4), may be moved out of recesses (5) in the core (3) and may be moved into the recesses (5) in the core (3) and the movable elements (4) in the moved out state touch the inner surface of the mold (2) at an area such that a component then filled in may not touch this area of the inner surface of the mold (2).

2. A method of manufacturing a lipstick lead having two cosmetic components, said method comprising the steps of:
    providing a mold and a core, said core being insertable into said mold thereby defining a space between said core and said mold, and said core having moveable elements capable of moving toward said mold from said core;
    inserting said core into said mold thereby defining a space between said core and said mold and moving said movable elements to said mold from said core;
    filling said space between said mold and said core with a first of the cosmetic components;
    withdrawing said core from said mold thereby leaving a void inside the first cosmetic component; and
    filling the void inside the first cosmetic component with a second cosmetic component.

3. The method set forth in claim 2, wherein said step of withdrawing said core from said mold is further defined by withdrawing said movable elements into said core.

4. The method set forth in claim 2, wherein said step of moving said moveable elements to said mold is further defined by moving said moveable elements into contact with said mold.

5. The method set forth in claim 2, wherein said step of filling the void inside the first cosmetic component with a second cosmetic component is further defined by filling a space in said first cosmetic component left by each of said moveable elements.

6. The method set forth in claim 2, wherein said step of moving said moveable elements to said mold is further defined by moving said moveable elements by pressure, magnetism or mechanical means.

7. A molding apparatus for molding a lipstick lead having a first component and a second component, comprising:
    a mold defining a mold cavity;
    a core being moveable into and out of said mold cavity, said core defining a tubular opening inside said mold cavity with said mold for molding a first lipstick component when said core is positioned inside said cavity;
    a secondary injector for injecting a second lipstick component into an opening defined in the first lipstick component by said core; and
    said core including moveable elements being moveable to a moved out state enabling said moveable elements to contact said mold thereby occupying space in said tubular opening formed between said mold and said core and said moveable elements being moveable into said core thereby enabling said core to be removed from said mold cavity after said first lipstick component has been molded, said moveable elements being retractable to evacuate the space previously occupied providing access to the space for said secondary injector enabling said secondary injector to inject the second lipstick component therein.

8. The molding apparatus according to claim 7, wherein said movable elements are moveable by means of pressure.

9. The molding apparatus according to claim 7, wherein said movable elements are moveable by means of magnetism.

10. The molding apparatus according to claim 7, wherein said outer surface of said core is coated by an anti-adhesive material.

11. The molding apparatus according to claim 7, wherein said core has channels for a heating and/or cooling medium.

* * * * *